United States Patent
Mariyani et al.

(10) Patent No.: US 11,683,775 B1
(45) Date of Patent: Jun. 20, 2023

(54) SYSTEM AND METHOD FOR 5G TELECOMMUNICATION UDM INSTANCE IDENTIFICATION

(71) Applicant: T-Mobile Innovations LLC, Overland Park, KS (US)

(72) Inventors: Anil Kumar Mariyani, Ashburn, VA (US); Rajil Malhotra, Olathe, KS (US); Anuj Sharma, Broadlands, VA (US); Chris Jensen, Snoqualmie, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 4 days.

(21) Appl. No.: 17/313,398

(22) Filed: May 6, 2021

(51) Int. Cl.
*H04W 60/04* (2009.01)
*H04W 24/04* (2009.01)
*H04W 8/02* (2009.01)

(52) U.S. Cl.
CPC .............. *H04W 60/04* (2013.01); *H04W 8/02* (2013.01); *H04W 24/04* (2013.01)

(58) Field of Classification Search
CPC ........ H04W 60/04; H04W 8/02; H04W 24/04
USPC ...... 455/435.1, 432.1, 436, 442, 466, 414.1, 455/418, 423
See application file for complete search history.

(56) References Cited

U.S. PATENT DOCUMENTS

2021/0029208 A1*   1/2021   Chen ...................... H04L 67/56

\* cited by examiner

*Primary Examiner* — Nghi H Ly
(74) *Attorney, Agent, or Firm* — Shook, Hardy & Bacon L.L.P.

(57) ABSTRACT

Systems and methods for 5G telecommunication UDM instance identification provided to UDRs for auditing purposes and tracking which of a plurality of UDMs is faulty. Specifically, a system for the provision of wireless telecommunication services can include a core network having a first UDR and a first UDM. The first UDM, upon receiving communication from one or more network functions, can communicate a first message to the first UDR. The first message can include a first UDM identification of the first UDM, indicating to the first UDR identification information associated with the first UDM. During tracking or auditing of this data, when the first UDM identification is found to be unable to perform a threshold percentage of write operations to the UDR within a threshold amount of time, communication is provided to a network repository function (NRF) that the first UDM is faulty and corrective action is required.

17 Claims, 4 Drawing Sheets

SYSTEM AND METHOD FOR 5G TELECOMMUNICATION UDM INSTANCE IDENTIFICATION

BACKGROUND

In 5G telecommunication networks, an end-to-end type architecture can include, for example, user equipment (UE), access network, core network, data network, and an application server or some other end point, such as another UE. The UE can be a mobile phone or the like for end-users to communicate with each other. The access network wirelessly connects the UE to the core network. The core network has numerous components providing various services within the network.

In 5G, core access and mobility management function (AMF) and session management function (SMF) generally replace the mobility management entity (MME) and divide functionality at the edge of the core network. The core network also includes the authentication server function (AUSF), unified data management (UDM), unified data repository (UDR), and the short message service function (SMSF). Within the core network, the UDM controls data for access authorization, user registration, and data network profiles. In a stateless embodiment, the UDM manages access authorization, user registration, and data network profiles and obtains actual user/subscriber information from the UDR. Various call events received by the UDM are then used to update or otherwise write to the UDR.

In 5G networks, the AUSF, UDR, and the UDM cooperatively replace the home subscriber service (HSS) used in prior 4G telecommunication networks. However, any errors that occur when data is transmitted between the UDM and the UDR can cause problems for the subscriber or UE in ways that are difficult to debug in current 5G networks. For example, when multiple UDMs communicate with a single UDR, the source of errors is not always clear.

SUMMARY

The present disclosure is directed, in part, to systems and methods for 5G telecommunication UDM instance identification. According to various aspects of the technology, a first aspect of the present disclosure is directed to a system for the provision of wireless telecommunication services. The system can be a core network or the like and can include a first UDR and a first UDM. The first UDM can be configured to communicate a first message to the first UDR. The first message can comprise a first UDM identification of the first UDM, indicating to the first UDR identification information associated with the first UDM.

According to another aspect, a method for tracking data exchange among wireless telecommunication services can include receiving, by a first UDM, communication from one or more network functions. Then, the method can include sending, via the first UDM, a first message to the first UDR in response to receiving the communication from at least one of the network functions. The first message can comprise a first UDM identification of the first UDM, indicating to the first UDR identification information associated with the first UDM. Furthermore, the method can include writing, via the first UDR, the first message including the first UMD identification into the first UDR upon receipt of the first message.

Yet another embodiment includes one or more non-transitory computer-readable media having computer-executable instructions embodied thereon that, when executed on one or more processors of one or more wireless telecommunication services, perform various steps for tracking data exchange among wireless telecommunication services. The steps can include, for example, a first UDM receiving communication from at least one network function and then sending a first message to a first UDR in response to receiving communication from the network functions. The first message can comprise a first UDM identification of the first UDM, indicating to the first UDR identification information associated with the first UDM. The steps can further include writing the first message, including the first UDM identification, into the first UDR. Furthermore, the steps can include a second UDM sending a second message to the first UDR. The second message can include a second UDM identification indicating to the first UDR identification information associated with the second UDM. Additionally, the steps can include writing the second message including the second UDM identification into the first UDR.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
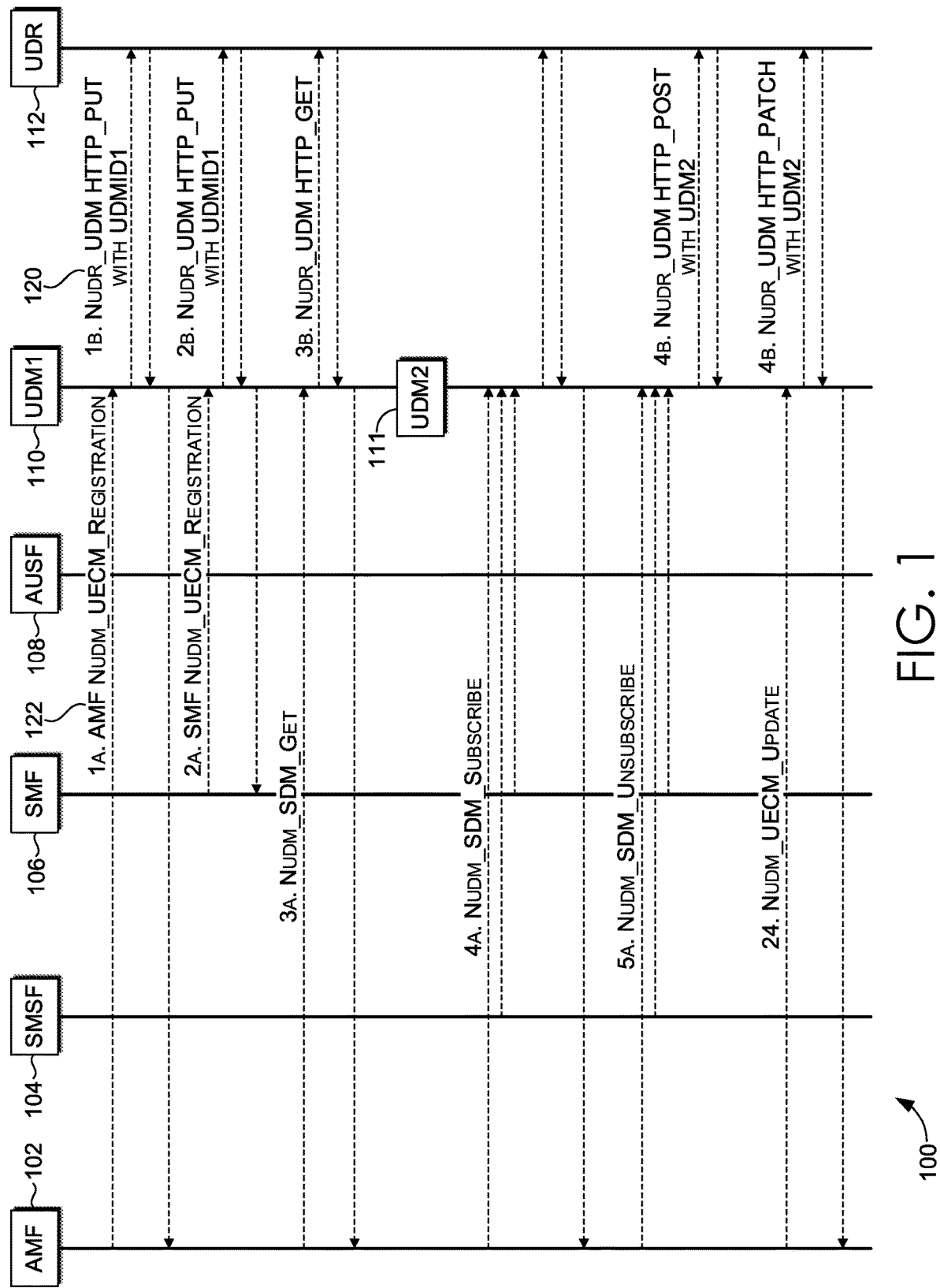
FIG. 1 depicts a diagram of an exemplary core network environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of this technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, 5G telecommunication networks can utilize an end-to-end type communications architecture that can include, for example, user equipment (UE), access network, core network, data network, and an application server or some other end point, such as another UE. The UE can include, for example, smart phones or other such devices operable to communicate via the 5G telecommunication networks. The access network can wirelessly connect the UE to the core network. The core network has numerous components providing various services within the network.

In 5G telecommunication networks, core access and mobility management function (AMF) and session management function (SMF) generally replace the mobility management entity (MME) and divide functionality at the edge of the core network. The core network also includes the authentication server function (AUSF), unified data management (UDM), unified data repository (UDR), and the short message service function (SMSF).

Within the core network, the UDM controls data for access authorization, user registration, and data network profiles. In a stateless embodiment, as described herein, the UDM manages access authorization, user registration, and data network profiles and obtains user/subscriber information from the UDR. Various call events received by the UDM are then used to update or otherwise write to the UDR. Write commands from the UDM to the UDR can include, for example, a "put" command, a "post" command, and/or a "patch" command. Furthermore, read requests from the UDM to the UDR requesting to read data from the UDR can include, for example, a "get" command.

In 5G networks, the AUSF, UDR, and the UDM cooperatively replace the home subscriber service (HSS) used in prior 4G telecommunication networks. However, any errors that occur when data is transmitted between the UDM and the UDR can cause problems for the subscriber or UE in ways that are difficult to debug in current 5G networks. For example, where multiple UDMs are communicating with a UDR, identifying a faulty UDM is difficult. In an operator network, subscriber database corruption often occurs when there are multiple UDM instances accessing the UDR for the same subscriber profile for various database write operations. Isolating the faulty UDM use case or sometimes a faulty UDM instance is not possible in prior art systems. The UDR is a centralized database and without UDMId in the UDR database journals or logs or subscriber outputs, it is difficult to understand a complete or 360-degree view of the customer UE behavior.

As a solution, the technology described herein adds UDM instance identification accompanying messages sent from any of the UDMs to the UDR. That is, between UDMs and UDRs on Nudr interface, UDM instance identification (UDMId) for N8, N10, N13, N21 interface call events are not written into the UDR. Without this UDMId, it is difficult to track the sequence of call events on the UDR database. These UDM instance IDs make database audits and isolating of faulting UDM instances less cumbersome and can allow for automated notification of such faulty UDMs to network function repositories (NRF). For example, the UDM instance identifications described herein can advantageously provide the ability to track user equipment (UE) behavior across various UDM instances, audit the UDR or database, perform database corruption recovery, debug interworking use-cases such as between 4G/5G handovers, and provide a subscriber 360-degree view of customer UE behavior.

The present disclosure is generally directed to a system for the provision of wireless telecommunication services. The system can be a core network or the like and can include a first UDR and a plurality of UDMs, such as a first UDM and a second UDM. The first UDM can be configured to communicate a first message to the first UDR in response to receiving communication from one or more network functions. The first message can comprise a first UDM identification (also referred to herein as a first UDM instance identification) of the first UDM, indicating to the first UDR identification information associated with the first UDM. The first UDM identification can be any identifying information or data assigned to the first UDM for identification purposes. This first UDM identification can be included in messages sent to the first UDR. Similarly, a second UDM can send a second message to the first UDR, with the second message including a second UDM identification (also referred to herein as a second UDM instance identification) of the second UDM indicating to the first UDR identification information associated with the second UDM In some embodiments, the system can include one or more non-transitory computer-readable media having computer-executable instructions embodied thereon that can, when executed on one or more processors of one or more wireless telecommunication services, perform various steps for tracking data exchange among wireless telecommunication services. Those steps can include, for example, sending the first message from the first UDM to the first UDR upon receiving communication from one of the network functions and then writing the first UDM identification of the first message into the first UDR. Likewise, those steps can include sending the second message from the second UDM to the first UDR upon receiving communication from one of the network functions and then writing the second UDM identification of the second message into the first UDR. Other aspects and details of this technology will be described in detail below.

FIG. 1 provides an exemplary call flow of a core network in which implementations of the present disclosure may be employed. Such a core network environment is illustrated and designated generally as core network 100. Core network 100 is but one example of a suitable core network and is not intended to suggest any limitation as to the scope of use or functionality of the invention. Neither should the core network be interpreted as having any dependency or requirement relating to any one or combination of components illustrated.

The core network 100 includes one or more of the following network functions: an AMF 102, a SMSF 104, a SMF 106, and an AUSF 108. Furthermore, the core network 100 includes a first UDM 110, a second UDM 111, and a UDR 112. Furthermore, various interfaces can be provided between the first UDM 110 and/or the second UDM 111 and any of the network functions 102-108, such as various Nudm interfaces. Likewise, interfaces can be provided between the first UDM 110 and the first UDR 112 or the second UDM 111 and the first UDR 112, such as Nudr interfaces, to allow messages to be sent and received to and from the first and/or second UDMs 110,111 and the first UDR 112. In some alternative embodiments, interfaces between the one or more of the network functions 102-108 directly to the first UDR 112 can also be utilized and/or include instance identification in an identical or similar manner to the UDM instance identification described herein.

Figure 5:
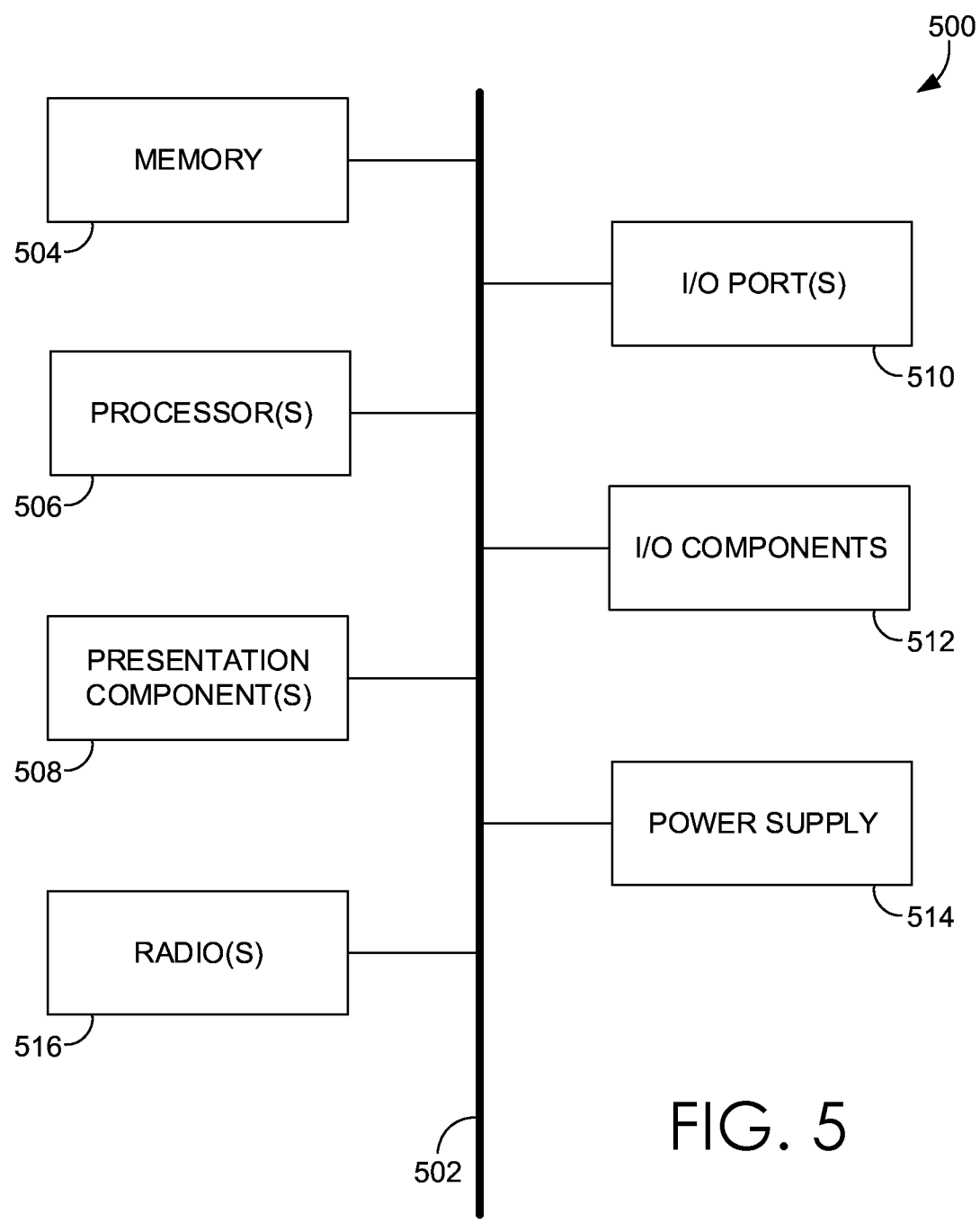
FIG. 5 depicts an exemplary computing environment suitable for use in implementations of the present disclosure.

A system such as the core network 100 can be used for the provision of wireless telecommunication services and can comprise the first UDR 112 and the first and/or second UDM 110,111, among the other components described herein. In some embodiments, the first UDM 110 and/or the second UDM 111 can comprise one or more processors 506 and the first UDR 112 can comprise memory 504, as depicted in FIG. 5 and described below. However, the first and/or second UDMs 110,111 and the first UDR 112 can comprise other computing components and functionality for completing the methods described herein without departing from the scope of the technology herein.

The first UDM 110 and the first UDR 112 are configured for sending and receiving of messages between each other, and the second UDM 111 and the first UDR 112 are likewise configured for sending and receiving of messages between each other. The first UDM 110 and/or the second UDM 111 can be configured to communicate, for example, a message to the first UDR 112. A first message from the first UDM 110 can comprise a first UDM identification or first UDM instance identification indicating to the first UDR 112 identification information associated with the first UDM 110. Likewise, a second message from the second UDM 111 can comprise a second UDM identification or second UDM instance identification indicating to the first UDR 112 identification information associated with the second UDM 111. The first UDM 110 and/or the second UDM 111 are configured to communicate a first message 120 or a second message 121, respectively, to the first UDR 112 in response to receiving a network function message 122 from one of the network functions 102-108. For example, the network function message 122 can be any communication the first UDM 110 or the second UDM 111 receives from the AMF 102, the SMSF 104, the SMF 106, or the AUSF 108. Upon receipt of the first message 120 or the second message 121, the first UDR 112 is configured to write the first message or the second message, including the first UDM identification or the second UDM identification, into memory or a database of the first UDR 112. In some embodiments, communication (i.e., the network function message 122) from the network functions comprises a network function instance identification that identifies a corresponding one of the one or more network functions as a source of the communication received by the UDMs described herein.

The first message 120 and/or the second message 121 can comprise write commands such as a "put" command, a "post" command, or a "patch" command. In some embodiments, the first message 120 and/or the second message 121 includes commands for the first UDM 110 or the second UDM, respectively, to request to read data from the first UDR 112, such as a "get" command. The network function message 122 from the network functions 102-108 can be associated with a user equipment (UE) accessing a different network slice, a handover operation of the UE, roaming of the UE in a home network, or roaming of the UE in a domestic or international partner network. In some embodiments, the network function message 122 includes or is associated with one of the following call events: register, subscribe, deregister, unsubscribe, update, or notify.

For example, the first UDM 110 can write the first UDM identification and the second UDM 111 can write the second UDM identification for various interface call flows, such as N8, N10, N13, and N21, among other call flows. That is, the first UDM 110 and/or the second UDM 111 provides services to the AMF 102, SMF 104, SMSF 106, AUSF 108, and others via a Nudm interface. Different functions connect to the Nudm interface via a dedicated interface. As depicted in FIG. 1, the N8 interface is between the AMF and the first or second UDM, the N10 interface is between the SMF and the first or second UDM, the N13 interface is between the AUSF and the first or second UDM, and the N21 interface is between the SMSF and the first or second UDM. Upon receiving any of these call flows or call events, the first UDM 110 or the second UDM 111 can communicate via a Nudr interface with the first UDR 112 to update or write data to the first UDR 112. For example, the first UDM 110 sends a message to the first UDR 112, with the message including the first UDM identification thereby identifying in the first UDR 112 that the message came from the first UDM 110.

Examples of types of Nudm events can include any one or more of the following:

a. Nudm_UECM_Registration
b. Nudm_SDM_Subscribe
c. Nudm_UECM_DeRegistration
d. Nudm_UECM_Update
e. Nudm_UECM_DeregistrationNotification
f. Nudm_UECM_Iwderegistrationnotification
g. Nudm_SDM_Notification
h. Nudm_Sdm_UpdatePDU
i. Nudm_EventExposure_Subscribe
j. Nudm_EventExposure_Notify
k. Nudm_SDM_Unsubscribe
l. Nudm_EventExposure_UnSubscribe The above-listed Nudm events can capture all interface call flows (N8, N10, N13, N21). In some embodiments, the first UDM 110 and/or the second UDM 111 writes UDM instance identification separately for one or more of the following: when the UE is roaming in home network, when the UE is roaming in a partner (Domestic/International) network, when the UE is experiencing a handover operation, and/or when the UE is accessing a different network slice. Each of the network function operations can be associated with a single UDM instance or multiple UDM instances. In some embodiments, an identifier of the UDM network function serving the UE for a particular 5G call event can be used by a network function service consumer. Furthermore, a faulty UDM instance when there is a software issue or database write operation issue on specific UDMs can be easily identified using the UDM instance identifications described herein.

Figure 2:
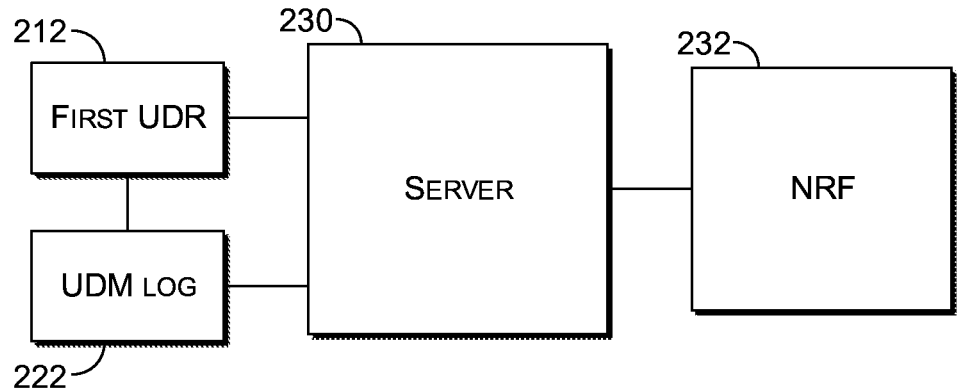
FIG. 2 depicts a diagram of an exemplary system for actively monitoring UDMs of the core network of FIG. 1, in accordance with aspects herein.

As depicted on FIG. 2, one embodiment for utilizing the technology described herein involves actively monitoring UDMs. For example, one or more UDM logs 222 can be tracked by a server or the like, such as server 230. The UDM logs 222 can contain the UDM instance identifications (such as the first UDM identification or the second UDM identification) and associated actions written into the first UDR, for example. If any UDM is unable to perform a predetermined percent of write operations (i.e., writing of a put, post, or patch command into the first UDR) within a predetermined time, the server 230 can mark that UDM as a faulty UDM. Then the server 230 can notify a network repository function (NRF) 232 with the instance identification of the faulty UDM. For example, if the first UDM is unable to perform a predetermined or preselected percent of write operations with a predetermined or preselected time, the server 230 can mark that the first UDM (such as the first UDM 110 of FIG. 1) is faulty.

Furthermore, the server 230 or another component of the systems described herein can automatically correct subscribers by auditing based on the instance identification of the faulty UDM and by initiating network initiated forced re-registration procedures to restore the subscriber services immediately. For example, in some embodiments, the server 230 is configured to notify the NRF, via transmission of the first UDM identification to the NRF, that the first UDM is faulty and cannot be used for future subscribers. Additionally or alternatively, the server 230 can be configured to notify the NRF that the first UDM is faulty and instruct the NRF to force re-registration of current subscribers associated with the first UDM such that the first UDM is no longer used by those current subscribers. The active monitoring of the UDMs is described herein in reference to the first UDM, however any of the UDMs and their associated identification or instance identification can be actively monitored in this manner without departing from the scope of the technology described herein.

Figure 3:
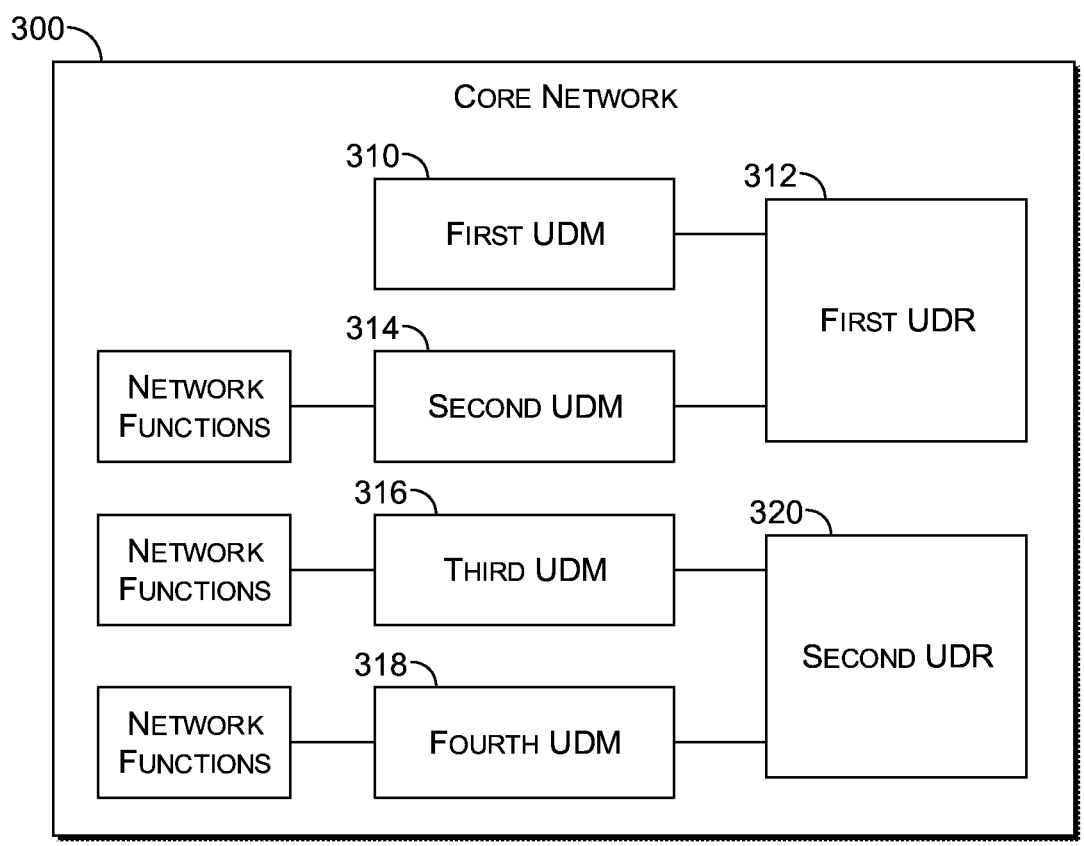
FIG. 3 depicts a diagram of a plurality of UDMs in communication with a plurality of UDRs, in accordance with aspects herein.

As depicted in FIG. 3, although the embodiments described herein include two UDMs, the core network or systems described herein can include any quantity of UDMs or UDRs without departing from the scope of the technology herein. For example, another embodiment of a core network 300 includes a first UDM 310, a second UDM 314, a third UDM 316, and a fourth UDM 318, as well as a first UDR 312 and/or a second UDR 320. Note that any of the first, second, third, and fourth UDMs 310,314,316,318 can communicate with any of the first UDR 312 and the second UDR 320. Each of the messages sent to any of the UDRs from any of the UDMs in this example embodiment can include corresponding UDM instance identification to identify whether the message originated from the first UDM 310, the second UDM 314, the third UDM 316, or the fourth UDM 318.

Figure 4:
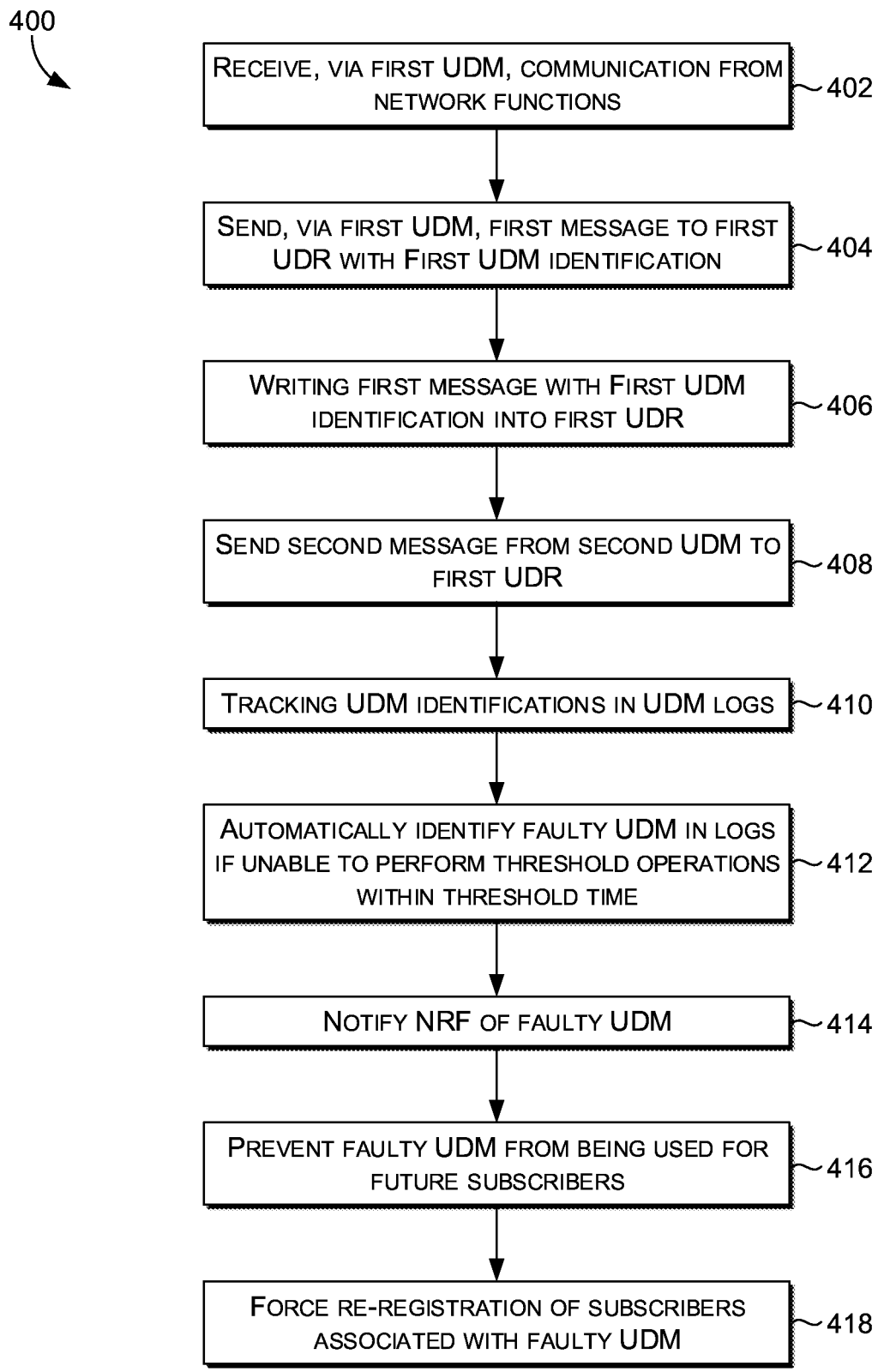
FIG. 4 depicts a flow diagrams of exemplary methods for writing UDM instance identifications into a UDR, in accordance with aspects herein.

As depicted in FIG. 4, a method 400 for tracking data exchange among wireless telecommunication services can include a number of steps, which can occur in the order depicted herein or in any other order without departing from the scope of the technology herein. Furthermore, one or more steps can be added, omitted, or duplicated without departing from the scope of the technology described herein.

As depicted in block 402, the method 400 can include a first UDM (such as UDM 110) receiving communication from one or more network functions, such as the network functions 102-108 in FIG. 1. Then, as depicted in block 404, the method 400 can include the first UDM sending a first message to a first UDR (such as the UDR 112) in response to receiving the communication from at least one of the network functions 102-108. The first message can include a first UDM identification indicating to the first UDR identification information associated with the first UDM. The method 400, as depicted in block 406, can further include writing, via the first UDR, the first message including the first UDM identification into the first UDR upon receipt of the first message.

In some embodiments, the method 400 further comprises sending, via a second UDM, a second message to the first UDR, as depicted in block 408. The second message can comprise a second UDM identification indicating to the first UDR identification information associated with the second UDM. However, any plurality of UDMs can communicate with the first UDR in various embodiments of the technology described herein. Note that any quantity of messages sent between one or more UDMs and the UDR can include UDM identification or UDM instance identification as described herein without departing from the scope of the technology herein, such that a source of the message between any of the UDMs and the first UDR is identified in the first UDR.

Additionally or alternatively, some embodiments of method 400 can include the step of tracking a plurality of UDM identifications including the first UDM identification in one or more UDM logs, as depicted in block 410, and automatically identifying the first UDM as faulty if the first UDM identification is unable to perform a threshold percentage of write operations to the first UDR within a threshold amount of time, as depicted in block 412. The threshold percentage of write operations and the threshold amount of time can be predetermined, selected by an administrator, or standardized within the system without departing from the scope of the technology described herein.

Furthermore, as depicted in block 414, the method 400 can include the step of notifying a network repository function (NRF) that the first UDM is faulty. This notification can be accomplished via transmission of the first UDM identification to the NRF. Then, as depicted in block 416, the NRF can prevent the first UDM associated with the first UDM identification from being used for future subscribers. Additionally or alternatively, the method 400, in response to the notification of block 414, can include a step of instructing the NRF to force re-registration of current subscribers associated with the first UDM such that the first UDM is no longer used by those current subscribers, as depicted in block 418. Note that these monitoring and notification steps can be performed for the second, third, or fourth UDMs described herein or any other UDMs without departing from the scope of the technology herein.

As noted above in regards to the system of FIG. 1, the one or more network functions in method 400 can include at least one of access and mobility management function (AMF), short message service function (SMSF), session management function (SMF), and authentication server function (AUSF). Furthermore, communication from the one or more network functions can be associated with a UE accessing a different network slice, a handover operation of the UE, roaming of the UE in a home network, or roaming of the UE in a partner network. The communication from the one or more network functions in method 400 can additionally or alternatively include one of the following call events: register, subscribe, deregister, unsubscribe, update, or notify. The first message or the second message can include write commands, such as a put command, a post command, or a patch command, as described above. Additionally or alternatively, read commands can be included in the first or second messages, such as a get command or the like.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for providing wireless telecommunication services comprising:
a first unified data repository (UDR);
a first unified data management (UDM) configured to communicate a first message to the first UDR, the first message comprising a first UDM identification of the first UDM, indicating to the first UDR identification information associated with the first UDM; and
one or more computer processing components having one or more UDM logs tracking a plurality of UDM identifications including the first UDM identification, wherein the server is configured to identify the first UDM as faulty if the first UDM is unable to perform a threshold percentage of write operations to the first UDR within a threshold amount of time.

2. The system of claim 1, further comprising a second UDM configured to communicate a second message to the first UDR, the second message comprising a second UDM identification indicating to the first UDR information associated with the second UDM.

3. The system of claim 1, the first UDM further configured to communicate the first message to the first UDR upon receipt of communication from one or more network functions.

4. The system of claim 3, wherein the communication from the one or more network functions comprises a network function instance identification that identifies a corresponding one of the one or more network functions as a source of the communication.

5. The system of claim 4, wherein the one or more network functions include at least one of access and mobility management function (AMF), short message service function (SMSF), session management function (SMF), and authentication server function (AUSF).

6. The system of claim 1, wherein the first message comprises a put command, a post command, or a patch command.

7. The system of claim 1, wherein the one or more processing components is configured to notify a network repository function (NRF), via transmission of the first UDM identification to the NRF, that the first UDM is faulty and cannot be used for future subscribers.

8. The system of claim 1, wherein the server is configured to notify a network repository function (NRF) that the first UDM is faulty and instruct the NRF to force re-registration of current subscribers associated with the first UDM such that the first UDM is no longer used by those current subscribers.

9. A method for tracking data exchange among wireless telecommunication services, the method comprising:
receiving, by a first unified data management (UDM), communication from one or more network functions;
sending, via the first UDM, a first message to a first unified data repository (UDR) in response to receiving the communication from the one or more network functions, the first message comprising a first UDM identification indicating to the first UDR identification information associated with the first UDM;
writing, via the first UDR, the first message including the first UDM identification into the first UDR upon receipt of the first message; and
tracking a plurality of UDM identifications including the first UDM identification in one or more UDM logs and one or more processing components automatically identifying the first UDM as faulty if the first UDM is unable to perform a threshold percentage of write operations to the first UDR within a threshold amount of time.

10. The method of claim 9, further comprising sending, via a second UDM, a second message to the first UDR, the second message comprising a second UDM identification indicating to the first UDR information associated with the second UDM.

11. The method of claim 9, wherein the one or more network functions include at least one of access and mobility management function (AMF), short message service function (SMSF), session management function (SMF), and authentication server function (AUSF).

12. The method of claim 9, wherein the communication from the one or more network functions is associated with a user equipment (UE) accessing a different network slice, a handover operation of the UE, roaming of the UE in a home network, or roaming of the UE in a partner network.

13. The method of claim 9, wherein the first message comprises a put command, a post command, or a patch command.

14. The method of claim 9, wherein the communication from the one or more network functions includes one of the following call events: register, subscribe, deregister, unsubscribe, update, or notify.

15. The method of claim 9, further comprising the one or more processing components notifying a network repository function (NRF), via transmission of the first UDM identification to the NRF, that the first UDM is faulty and cannot be used for future subscribers.

16. The method of claim 9, further comprising the server notifying a network repository function (NRF) that the first UDM is faulty and instructing the NRF to force re-registration of current subscribers associated with the first UDM such that the first UDM is no longer used by those current subscribers.

17. One or more non-transitory computer-readable media having computer-executable instructions embodied thereon that, when executed on one or more processors of one or more wireless telecommunication services, perform the following steps:
receiving, by a first unified data management (UDM), communication from one or more network functions;
sending, via the first UDM, a first message to a first unified data repository (UDR) in response to receiving the communication from the one or more network functions, the first message comprising a first UDM identification indicating to the first UDR identification information associated with the first UDM;
writing, via the first UDR, the first message including the first UDM identification into the first UDR upon receipt of the first message;
sending, via a second UDM, a second message to the first UDR, the second message comprising a second UDM identification indicating to the first UDR identification information associated with the second UDM;

writing, via the first UDR, the second message including the second UDM identification into the first UDR upon receipt of the second message; and tracking a plurality of UDM identifications including the first UDM and the second UDM in one or more UDM logs.

* * * * *